United States Patent [19]

Bergquist et al.

[11] Patent Number: 5,289,489
[45] Date of Patent: Feb. 22, 1994

[54] ALL-OPTICAL LIGHT MODULATING APPARATUS AND ALL-OPTICAL PROCESS FOR MODULATING LIGHT

[75] Inventors: Johan Bergquist, Atsugi; Yasuo Tomita, Yokohama, both of Japan

[73] Assignee: Canon Kabushiki Kaisha, Tokyo, Japan

[21] Appl. No.: 837,974

[22] Filed: Feb. 20, 1992

[30] Foreign Application Priority Data

Feb. 28, 1991 [JP] Japan .................................. 3-058113

[51] Int. Cl.[5] .............................................. H01S 3/10
[52] U.S. Cl. ........................................ 372/26; 372/45; 372/27; 372/71
[58] Field of Search ................ 372/45, 50, 26, 27, 372/29, 71, 70

[56] References Cited

U.S. PATENT DOCUMENTS 5,073,892  12/1991  Uomi et al. ............................ 372/26

FOREIGN PATENT DOCUMENTS 0124792  6/1987  Japan ..................................... 372/45
0094689  4/1989  Japan ..................................... 372/45

OTHER PUBLICATIONS

"New Photorefractive Effect in Graded-Gap Superlattices", Physical Review Letters, Ralph et al., vol. 63, pp. 2272-2275, 1989.

Primary Examiner—Georgia Y. Epps
Attorney, Agent, or Firm—Fitzpatrick, Cella, Harper & Scinto

[57] ABSTRACT

A light modulating apparatus includes a semiconductor device having a quantum well structure and a device for applying an electric field to the quantum well structure of the semiconductor device. Both of pump and probe light beams or a pump and probe light beam is input into the semiconductor device. The pump light beam or pump and probe light beam received by the semiconductor device causes a real charge excitation in the quantum well structure, and the real charge excitation screens the electric field applied to the quantum well structure. The polarization state of the probe light beam or pump and probe light beam emerging from the semiconductor device is changed by an electrooptical effect in the quantum well structure induced by the real charge excitation. A polarizer may be disposed for converting a change in polarization state of the light emerging from the semiconductor device into a change in intensity of the light.

18 Claims, 3 Drawing Sheets

ALL-OPTICAL LIGHT MODULATING APPARATUS AND ALL-OPTICAL PROCESS FOR MODULATING LIGHT

BACKGROUND OF THE INVENTION

1. Field of the Invention

The present invention relates to an all-optical light modulating apparatus such as optical modulators and optical switches and a process for modulating light capable of speedily modulating light by an all-optical means, which are suitable to be used in optical communication systems and the like.

2. Related Background Art

In recent years, several methods of converting information contained in a shorter wavelength (e.g., 800 nm) light beam to that contained in a light beam of a longer wavelength (e.g., 1.55 μm) have been proposed. One is to let the shorter wavelength light be detected by a photodetector which is in turn connected to an electronic control circuit. The circuit modulates a longer wavelength laser electrically by either a means of direct current modulation or an external electrooptic modulator utilizing phase shift or electro-absorption. In the former, the longer wavelength laser is directly oscillated by modulating a driving current thereof. In the latter, the longer wavelength laser is continuously oscillated by a constant driving current, and the thus oscillated light beam is modulated by the external modulator using an electrooptic crystal or the like.

In such a structure, even though the photodetector, the control logic, the modulator and/or laser can be fully integrated on a single substrate, there are some obstacles for doing so. One is that lasers or modulators working at 1.55 μm are based on other material systems (i.e., InGaAs, InSb and the like) than those working at 800 nm (i.e., AlGaAs and the like), so that the former devices are not completely problem-free to integrate with the 800 nm components which are based on the AlGaAs material systems. Working with lasers or modulators in the 1.55 μm material systems implies a problem of high absorption due to the closeness of band gaps of those materials. Further, material incompatibility (lattice mismatch) implies manufacturing obstacles and a degradation of the crystal structure which in turn result in unnecessary scattering of the light subject to modulation.

When using a directly modulated 1.55 μm laser, the modulation speed is most certainly limited by chirp or other unwanted transient effects of directly modulated lasers.

In the case of operating a 1.55 μm CW (continuous wave) laser and employing an external modulator, the modulation speed is limited by the RC time constant of the modulating device, as in the case of direct laser modulation.

This is in fact a problem that one always has to cope with when considering the electrooptic alternative for controlling a 1.55 μm beam by a 800 nm beam.

Conventional all-optical and semi-optical alternatives lack this drawback. Those previous optical modulators, however, have not been dealing with the control of a beam of a wavelength considerably different from that of the controlling beam, but rather signal beams of the same wavelength range. One example is the SEED (SElf Electrooptic Device) which is based on the voltage drop induced by a photo-current flowing through an external resistance serially connected with the device. The flow of photo-current is caused by a light beam incident on the device. The voltage drop in turn changes the inclination of a band energy structure of the device to shift its absorption edge, so that another light beam or the incident light beam itself can be intensity-modulated. However, a 1.55 μm beam cannot be intensity-modulated by a 800 nm beam using the SEED device. In conclusion, even though it is possible to utilize the change in the voltage to induce a refractive index change, there are severe problems of large RC time constants because of the use of external resistor circuits.

Further, there exists, as a scheme that allows an intensity modulation, a device in which the index grating is optically induced to in turn deflect a beam subject to modulation. In this case, in order to obtain a large on/off contrast ratio, the diffraction efficiency of the grating must be of a considerable magnitude. In order to achieve this, either light beams having large intensities or ferroelectric materials having a large electrooptic coefficient, should be used. However, the use of available ferroelectric materials implies a very slow response of the order of a second or slower, which, of course, is completely undesirable in optical communication systems.

Furthermore, there exists a device utilizing a photorefractive effect (PR effect). The PR effect signifies the following phenomenon. When an electron located in a given impurity level is optically excited and moved to a conduction band, the electron is diffused and drifted in the conduction band and then captured in a capture level. A spatial charge electric field generated by the captured electron results in a nonleinear change in refractive index due to an electrooptic effect (i.e., a Pockels effect). The impurity level is generally called a deep level having an energy gap sufficiently larger than that of thermal energy (26 meV) at a room temperature, in contrast to a donor or acceptor level serving as a shallow level. The capture level is generally an ionization level of the impurity level.

By using photorefractive semiconductors, the response time becomes considerably faster, but unfortunately, the grating efficiency will be much lower resulting in a low-contrast all-optical device. Another drawback of the index grating-based devices using the photorefractive index crystal is that they require two coherent beams to write the grating therein. Since the information-bearing light at 800 nm is most oftenly confined in integrated waveguides, it is troublesome to interface devices containing those waveguides with the two-beam index grating device.

Recently, a new photorefractive effect which does not require a grating to be written by two coherent beams has been discovered. A change in the refractive index of a graded-gap quantum well structure (the structure in which the band gap changes along a direction of the barrier layer) is induced by the carrier generation due to an optical field. The carriers migrate due to an internal electric field caused by the graded gap to finally be trapped in quantum wells. Also the corresponding holes are subject to this process, but at a slower rate, so that there will be a spatial charge separation between electrons and holes resulting in a transient space-charge electric field. As a result, the refractive index is changed via the electrooptic effect. In this connection, see "Ralph et. al., Physical Review Letters, vol. 63, pp. 2272-2275 (1989)". In such a device, although the disadvantage of relying on two beams to induce an index change which could be probed by a beam subject to modulation has been eliminated, there is still a major disadvatage left, namely, a slow response time resulting from the limited migration from the location of excitation to the wells where the carriers are trapped. The response time is thus dependent both on this fact and the recombination time in the wells.

SUMMARY OF THE INVENTION

An object of the present invention is to provide an all-optical light modulating apparatus and a process for modulating light capable of solving the conventional problems described above and modulating light at a sufficient speed and at a high contrast.

According to one aspect of an all-optical light modulating apparatus of the present invention, there are provided a semiconductor device including a quantum well structure, a device for applying an electric field to the quantum well structure of the semiconductor device, a device for inputting a probe light into the semiconductor device and a device for inputting a pump light into the semiconductor device for causing a real charge excitation in the quantum well structure. The electric field applied to the quantum well structure is screened by the real charge excitation. The probe light is output from the semiconductor device with its polarization state being changed by an electrooptic effect due to the screening. Thus the probe light is modulated all-optically.

The change of the polarization state of the probe light output from the semiconductor device may be converted into an intensity change of the output probe light by a polarizer, and a phase plate may be disposed in a light path of the probe light towards the polarizer.

According to another aspect of an all-optical light modulating apparatus of the present invention, there are provided a semiconductor device including a quantum well structure, a device for applying an electric field to the quantum well structure of the semiconductor device and a device for inputting a probe and pump light into the semiconductor device. The light is output from the semiconductor device with its polarization state being changed by an electrooptic effect in the quantum well structure, and the electric field applied to the quantum well structure is screened by a real charge excitation caused by the light. The electrooptic effect is induced by the screening.

According to one aspect of an all-optical light modulating process of the present invention, there are provided the steps of applying an electric field to a quantum well structure of a semiconductor device, inputting a probe light into the semiconductor device and inputting a pump light into the semiconductor device for causing a real charge excitation in the quantum well structure. The probe light is output from the semiconductor device with its polarization state being changed by an electrooptic effect in the quantum well structure, and the electric field applied to the quantum well structure is screened by the real charge excitation.

The process may comprise a step of converting the change of the polarization state of the probe light output from the semiconductor device into an intensity change of the output probe light by a polarizer. Further, the process may comprise a step of causing the probe light to pass through a phase plate disposed in a light path of the probe light towards the polarizer.

According to another aspect of an all-optical light modulating process of the present invention, there are provided the steps of applying an electric field to a quantum well structure of a semoconductor device, and inputting a probe and pump light into the semiconductor device. The light is output from the semiconductor device with its polarization state being changed by an electrooptic effect in the quantum well structure, and the electric field applied to the quantum well structure is screened by a real charge excitation caused by the light.

In the apparatus and process of the present invention, real-excited carriers (electrons and holes) are spatially separated by the electric field applied to the semiconductor quantum well structure, and the optical index-anisotropy is induced by the charge separation via the electrooptic effect and utilized. Therefore, a sufficiently speedy response can be attained. Further, the real excitation is utilized, so that a sufficient contrast ratio can be achieved unless a pump light having a considerable intensity is used.

Thus the real excitation is utilized in the present invention. This principle will be compared with the principle of virtual excitation. In the principle of virtual excitation, virtual carriers are generated by an optical pump beam at a wavelength corresponding to an energy slightly detuned from the band gap. The virtual carriers are then spatially separated by an external DC field, and a field occuring from this charge separation is directed opposite to the external DC field and will thus screen the external field resulting in an overall voltage change across the structure. This voltage change is then used to modulate the refractive index through the electrooptic effect, which can be sensed by a beam at 1.55 $\mu$m. Thus, virtual carriers allow a sub-picosecond response time, and only one controlling beam is required to induce a refractive index change. Further, absorption at 1.55 $\mu$m is very low when the AlGaAs material system is used.

There are, however, two severe facts that reduce the possibility of using this scheme. One is that the required pump optical intensity for generation of virtual carriers is of the order of GW/cm$^2$. Second, the phase change of a probe light becomes relatively small (e.g., the order of 0.01°).

In contrast, the principle of the present invention is as follows. Considering the present invention's application of a device that transfers information decoded at 800 nm, e.g., optical discs, there is no need for fs (femto second) response time since the source information bearing signal is modulated at a moderate rate. This is true also for current local area networks, compact disc players, laser disc players.

In the present invention, by employing a structure similar to the virtual carrier type, but selecting a wavelength of the pump above the band gap energy, real carriers will be generated by the pump. This process requires a far less intensity of the pump beam compared to the virtual carrier scheme to get a substantial screening field from the generated carriers. The sub-picosecond response time cannot be obtained, but by employing a resonant pump and achieving real carriers, the resulting screening field from the carriers will be much larger compared to the virtual screening field induced by the virtual carriers. This in turn leads to a substantially larger change in the refractive index so that a larger phase shift is generated in the probe beam. When applying the phase shift mechanism in an intensity modulator scheme, the overall phase shift in the quantum well structure is increased and the on/off contrast will be improved. While the phase shift of the virtual charge device is estimated to be of the order of 0.01°, that of the proposed device in the present invention reaches 1.45° using a geometrical structure similar to the virtual charge device.

It should be pointed out that instead of letting the probe beam direction be perpendicular to the device layers, it is possible to have it parallel to the layers in a single mode waveguide formed by the multiple quantum well (MQW) core. By doing so, the interaction length, and hence the total phase shift can be greatly enhanced. The direction of the control or pump beam could be either perpendicular or parallel to the layers.

In conclusion then, if the requirements to response time are moderate, but still high enough to rule out devices using external electronic circuit RC-time limiting devices, and the modulation of beams having wavelengths where absorption should be low is desired, the present invention's device indeed offers preferable properties.

Further, in the present invention in which the response time is moderate, even when pump light and probe light are ultra-short pulses, the change of refractive index caused by the pump light can still be sensed by the probe light in spite of the dispersion due to the difference in their wavelengths.

These advantages and others will be more readily understood in connection with the following detailed description of the preferred embodiment in conjunction with the drawings.

DESCRIPTION OF THE PREFERRED EMBODIMENT

Figure 1:
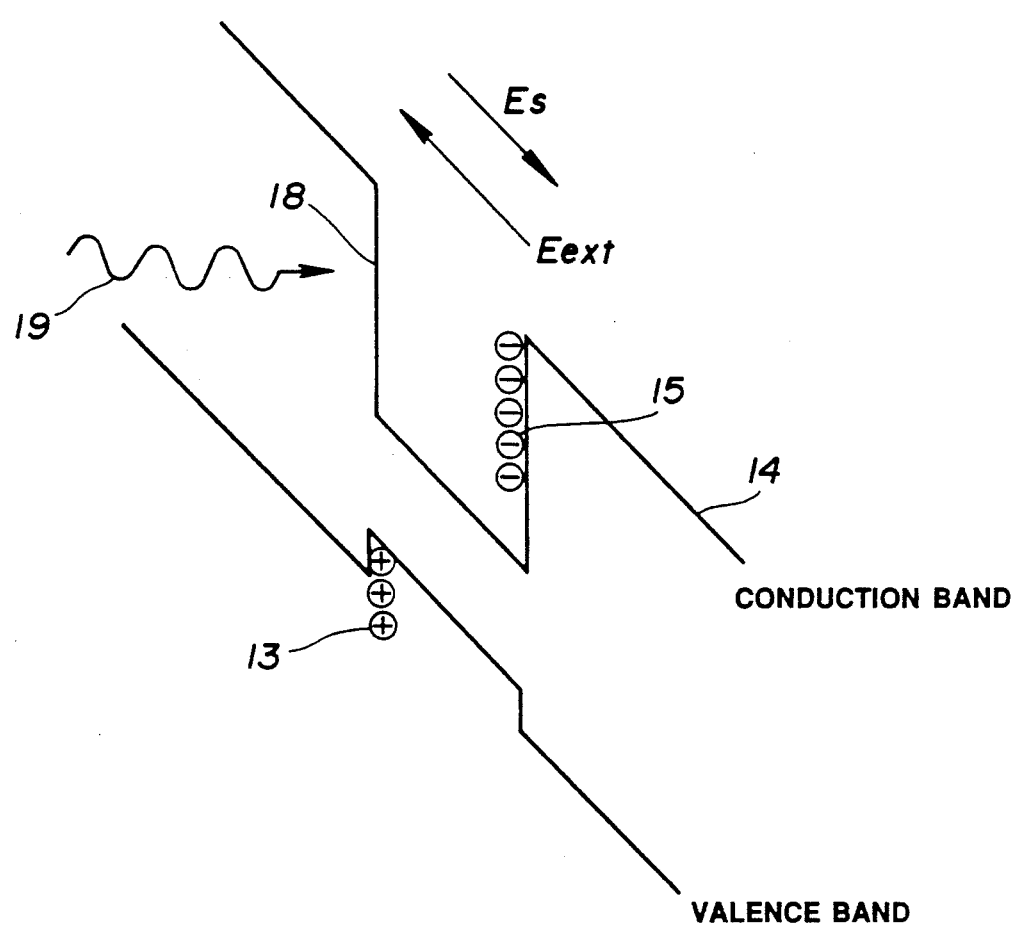
FIG. 1 is an illustration showing an inclined energy band structure for explaining a real charge excitation in an embodiment of the present invention.

Initially, the phenomenon of a charge separation excitation in the quantum well will be explained (see M. Yamanishi, Applied Physics, vol. 58, pp. 1696-1707 (1989)). FIG. 1 shows an inclined energy band of the MQW structure to which a DC (static) electric field $E_{ext}$ is applied. Here, only one well 18 and barriers 14 adjacent thereto are depicted. It is assumed that the 800 nm wavelength range information-carrying or signal beam (pump light) 19 is incident on an MQW structure designed to have an absorption peak at the particular wavelength used. This is achieved by choosing an appropriate value of the width or thickness of the well 18. The pump light 19 will generate carriers 13 and 15 (holes 13 and electrons 15). Those carriers are respectively driven in opposite directions by the external electric field $E_{ext}$ as shown in FIG. 1. to be separated spatially by the width of the well 18. The separated carriers 13 and 15 become confined in the wells 18 since the barriers 14 are sufficiently high. As a result, a reverse field or screen field $E_s$ is generated in a direction that screens the external field $E_{ext}$. Normally, the layers adjacent to the MQW region are designed and doped so that most of the voltage drop occurs across the undoped MQW region. Ideally, the layers next to the MQW layers 14 and 18 should be heavily doped in order to achieve this. However, regarding the waveguiding properties of the MQW layers which have to be taken into account when either of the pump and probe beams or both are to be propagated parallel to the layers, it would cause a large loss in the cladding layers next to the guiding MQW layers if they were heavily doped. Therefore, the layers next to the MQW region are also intrinsic (undoped) in this case. Anyway, the cladding layers are very thin, so most of the voltage drop will occur across the MQW layers 14 and 18.

Since a semiconductor constituting the quantum well structure generally has an electrooptic effect (i.e., a Pockels effect) in an atomic structure of constituent elements under the static electric field, in addition to the electrooptic effect obtained by this initially applied DC electric field, a change in the electrooptic effect caused by the reverse or counter electric field $E_s$ occurs. This indicates that the optical anisotropy of the quantum well structure which is induced upon application of the DC electric field is further changed by the cunter electric field $E_s$.

The relative change amount or magnitude of a refractive index due to the optical anisotropy generated by the voltage drop change V caused by the reverse field $E_s$ in each well 18 is given by:

$$\Delta n = \tfrac{1}{2} \cdot q n_o^3 r_{eff} V \qquad (1)$$

where $n_o$ is the refractive index without applied field, $r_{eff}$ is the effective electrooptic coefficient (m/V), q is a constant depending on the relationship between the orientation of the crystal and the applied DC electric field $E_{ext}$.

Carriers 13 and 15 remain in the well 18 as long as the pump light 19 is switched on. When the pump light is switched off, the carriers 13 and 15 will recombine at a rate determined by the lifetime at the particular circumstances. The lifetime is dependent on the actual field strength. The relative index change magnitude $\Delta n$ is detected by the probe light. It should be pointed out that the MQW structure material such as AlGaAs is highly trasparent to a wavelength much longer than the wavelength corresponding to its band gap. Thus, it is possible to change the refractive index by the input pump beam and detect the index change by the probe light. The relative phase change magnitude $\Delta \psi$ of the probe light at this time is represented by:

$$\Delta \psi = 2\pi/\lambda \cdot n_o^3 r_{eff} V \qquad (2)$$

where $\lambda$ is the wavelength in vacuum of the probe light.

Figure 2:
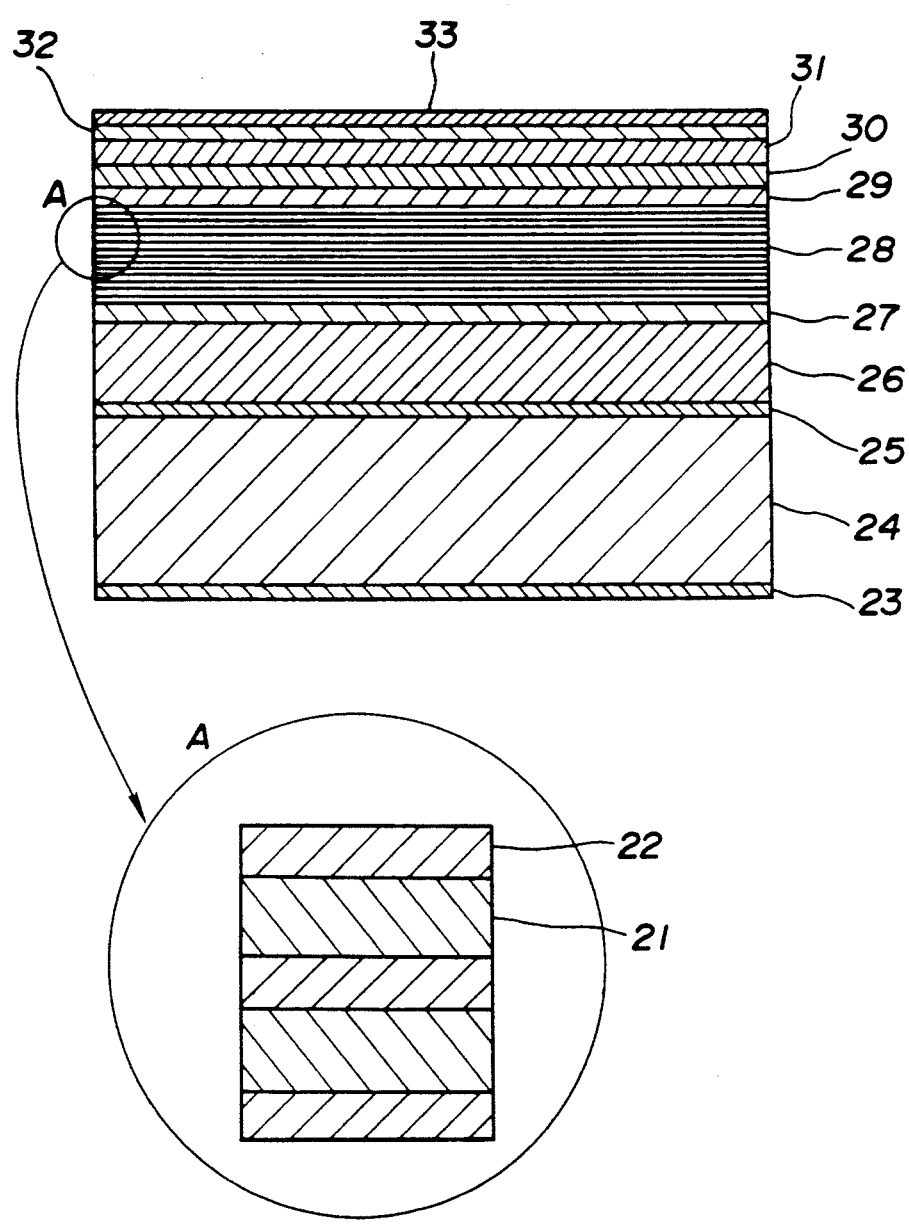
FIG. 2 is a sectional view showing a device including a multiple quantum well structure portion.

An example of a device including the MQW structure of a phase modulating portion will be described referring to FIG. 2. The main part of the device, the phase modulating part, is fabricated on an n+-doped <001> oriented GaAs substrate 24. The negative dopant thereof is Si and the n+ density is $2 \times 10^{18}$ cm$^{-3}$. On the substrate 24, there are formed an n+-doped GaAs buffer layer 25 having a thickness of 0.2 μm, an n-doped AlAs electrode layer 26 having a thickness of 5 μm, an intrinsic (ф-) AlAs lower cladding layer 27 having a thickness of 0.4 μm, an intrinsic multiple quantum well (MQW) structure region 28 comprising 200 periods of 120 Å thick GaAs wells 21 and 80 Å thick AlAs barriers 22, an intrinsic 0.4 μm thick AlAs upper cladding layer 29, a p-doped electrode layer 30 having a thickness of 0.5 μm, a p+-doped GaAs cap layer 31 and a 0.5 μm thick electrode consisting of 0.25 μm thick Cr 32 and 0.25 μm thick Au 33. Another electrode 23 is formed on the bottom of the substrate 24. The doping densities n, p and p+ are $2\times10^{17}$, $2\times10^{17}$, and $2\times10^{18}$ cm$^{-3}$, respectively. The p dopant is Be.

Figure 3:
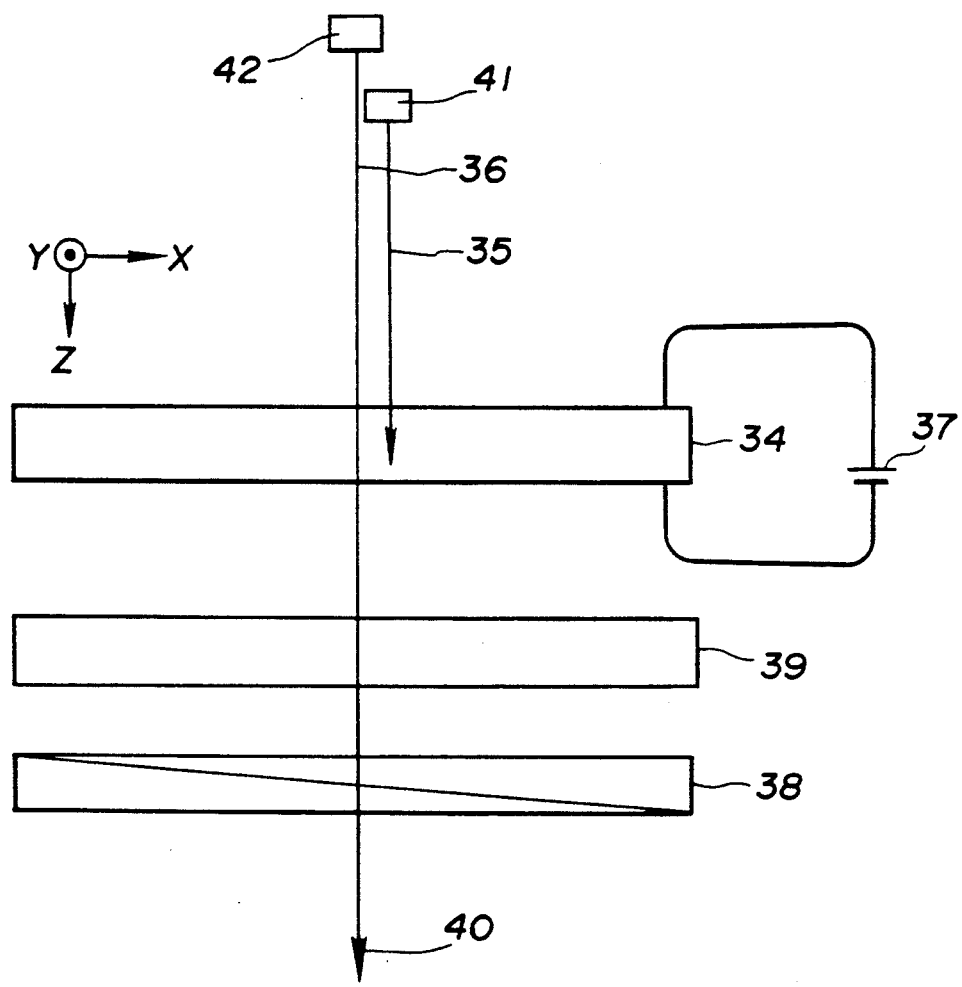
FIG. 3 is a view showing a structure for converting a phase modulation to a light intensity modulation.

A total schematic view of an intensity modulating apparatus including the above-discussed device is shown in FIG. 3. A pump light 35 from a signal source 41 and a probe light 36 from a laser source 42 are incident on a phase modulating device 34 which is biased by an external DC field source 37 as shown in FIG. 3. The phase modulated light then passes on to a phase plate 39 and a polarizer 38, and the phase modulated light has been converted into an intensity modulated output 40. Thus, the pump light 35 having appropriate wavelength and light intensity for inducing the above-discussed real excitation charge separation is incident on the material 34 having the quantum well structure to which the DC electric field is applied, thereby inducing the voltage change in the quantum well structure. The relative phase change $\Delta\psi$ (see the equation (2)) caused by this voltage change is detected in the following manner.

For example, the probe light 36 is composed of a polarized light having components having identical magnitudes in the <110> direction as the x-axis and the <−110> direction as the y-axis when the z-axis is defined as the <001> direction in FIG. 3.

The probe light 36 should not be preferably absorbed by the semiconductor device 34, but has a wavelength sufficiently sensitive to the electrooptic effect. The change in phase of the light 36 having passed through the semiconductor device 34 is converted into a change in light intensity by the phase plate 39 and the polarizer 38, and this light is output as the modulated light 40. A light intensity I of the modulated light 40 can be obtained as follows:

$$I = \tfrac{1}{2} I_o(1 + \sin 2\theta \cdot \cos \psi) \quad (3)$$

where $I_o$ is the total light intensity of the transmitted light 40 when there is no phase shift, and $\theta$ is the angle of the transmission axis of the polarizer 38 with respect to the x-axis. If a relative phase difference of the phase plate 39 between the x-axis and the y-axis is $\phi$, a phase difference of the probe light 36 between the x-axis and the y-axis is $\rho$, and a relative phase difference of the optical anisotropy at the semiconductor device 34 between the x-axis and the y-axis when no probe light is incident on the device 34 is $\epsilon$, then $\psi$ is defined as follows:

$$\psi = \Delta\psi + \rho + \phi + \epsilon \quad (4)$$

If the phase difference $\phi$ of the phase plate 39 is set to satisfy the following condition for $\theta = \pi/4$:

$$\phi = -\rho - \epsilon \pm \pi/2 \quad (5),$$

the following equation is obtained:

$$I = \tfrac{1}{2} I_o(1 \pm \sin \Delta\psi) \quad (6)$$

where double signs are not the same order.

It should be noted that a bias point is set to $\psi = \pm\pi/2$ to optimize or make most sensitive a change in $\Delta\psi$. In the above case, a phase difference between the orthogonal polarized components of the probe light 36 is arbitrarily determined. However, the phase difference $\rho$ may be given in advance to satisfy the condition (5). In this case, the phase plate 39 need not be located at the position indicated in FIG. 3. That is, the phase plate 39 may be located in front of the semiconductor device 34 to satisfy the condition (5).

In the above structure, the substrate 24 and the electrodes may preferably have openings through which the probe light 36 is transmitted.

The maxmum relative phase shift possible in the above-discussed structure can be calculated as follows. The ultimate phase modulation depth occurs when the external DC field is completely screened by the carrier-induced reverse field. The maximum change of the total field in the wells is therefore determined by the maximum bias field strength which in turn is given by the breakdown field $E_{BD} = 300$ kV·cm$^{-1}$. In the case of the present structure, where 200 periods of 120 Å quantum GaAs wells 21 and 80 Å AlAs barriers 22 are formed, and assumed that the total voltage drop will occur across the MQW region 28, the maxmum change in the field strength occurs if the external field can be completely screened by utilizing the carriers inside the given wells. To do so, it is necessary to induce a reverse field strength of the same magnitude as the maximum applicable external field, i.e., 300 kV·cm$^{-1}$, which corresponds to a certain carrier density in the well structure through the Poisson's equation.

Next the required pump light intensity $I_o$ to achieve this carrier density will be calculated. The induced charge $\Delta Q$ at the well edges is given by:

$$\Delta Q = (eI_o \tau_r/(hc/\lambda))\{1 - \exp(-\alpha L_z)\}$$

where $\alpha$ is the absorption coefficient and $L_z$ is the thickness of the well. The screening electric field $E_s$ corresponding to the carrier density is given by solving the Poisson's equation:

$$\Delta Q = \epsilon_0 \epsilon_{DC} E_s$$

where $\epsilon_0$, $\epsilon_{DC}$ and $E_s$ is the vacuum permeability, the DC dielectric constant for GaAs ($=13.1$) and the desired screening field strength, respectively. Solving these two equations for $I_o$ yields the required pump light intensity $I_o$ to produce the screening field of 300 kV/cm. Assuming that the carrier lifetime $\tau_r$ is 50 ns, a value of 275 W·cm$^{-2}$ is reached, which is easily achievable from most semiconductor lasers by appropriate focusing. The carrier lifetime of 50 ns is in fact much shorter (10 ns) when total screening of the field occurs. The recombination time of 10 ns corresponds roughly to a bit rate of 100 Mb/s, which is higher than most applications of the present invention mentioned above.

The maximum screening field $E_{smax}$ mentioned above results in a total voltage drop across the wells of 72 V ($E_{smax} \times 200 \times 120$ Å). According to the above equations, the corresponding phase shift then becomes 1.44° when q=1 is assumed, which in turn corresponds to an intensity contrast of 0.11 dB. This value is rather low, but much larger than the virtual carrier device. An ideal modulator working according to the principle would have a phase shift of 180°. As far as the present discussion is concerned, the probe light propagates perpendicular to the layers, which yields a phase change interaction distance of only $200 \times 120$ Å$=2.4$ μm. The corresponding phase shift then becomes 6000° ·cm$^{-1}$. With the present device, it is also possible to let the probe beam propagate along the waveguide while the pump beam can either be launched parallel or perpendicular to the layers. Using the above propagation manner and the phase shift per unit length, it is seen that a 300 μm long device would yield a relative phase shift of 180° and thus a maximum contrast.

The apparent applications of the present invention are transmission of information coded in a 800 nm system on a 1.55 μm wavelength. Examples of such applications are transmission of data retreived from an optical disc memory over a telephone network fiber (1.55 μm), broadcasting of analogue video, digital sound or other sources requiring only moderate modulation speeds, directly to subscribers ("fiber to the home") using the standard 1.55 μm telephone network. Generally, when the distance or communication system requirements rule out every system but the 1.55 μm wavelength and when the information subject to transmission is coded at 800 nm, the device of the present invention proves to be a powerful component.

While the present invention has been described with respect to what is presently considered to be the preferred embodiment, it is understood that the invention is not limited to the disclosed embodiment. The present invention is intended to cover various modifications and equivalent arrangements included within the spirit and scope of the appended claims.

What is claimed is:

1. A light modulating apparatus comprising:
 a semiconductor device including a quantum well structure;
 means for applying an electric field to said quantum well structure of said semiconductor device;
 probe light inputting means for inputting a probe light into said semiconductor device, the probe light being output from said semiconductor device with a polarization state of the probe light being changed by an electrooptic effect in said quantum well structure; and
 pump light inputting means for inputting a pump light into said semiconductor device for causing a real charge excitation in said quantum well structure, the electric field applied to said quantum well structure being screened by the real charge excitation,
 wherein when said probe light inputting means inputs the probe light into said semiconductor device, said pump light inputting means inputs the pump light carrying information into the semiconductor device, so that the semiconductor device outputs the probe light modulated with the polarization state in accordance with the information.

2. A light modulating apparatus according to claim 1, further comprising a polarizer for converting the change of the polarization state of the probe light output from said semiconductor device into an intensity change of the output probe light.

3. A light modulating apparatus according to claim 2, further comprising a phase plate disposed in a light path of the probe light towards said polarizer.

4. A light modulating apparatus according to claim 1, wherein said semiconductor device comprises an n-doped GaAs substrate, an n-doped GaAs buffer layer, an undoped AlGaAs lower cladding layer, an undoped multiple quantum well structure layer, an undoped AlGaAa upper cladding layer, a p-doped AlAs layer, a p-doped AlGaAs cap layer and electrodes formed on both upper and lower surfaces of said device.

5. A light modulating apparatus according to claim 1, wherein the probe light has a wavelength of 1.55 μm and the pump light has a wavelength of about 800 nm corresponding to a band gap energy of said quantum well structure of said semiconductor device.

6. A light modulating apparatus according to claim 1, wherein said quantum well structure is fabricated so that there is almost no absorption loss of the probe light therein.

7. A light modulating apparatus according to claim 1, wherein said quantum well structure is fabricated so that a refractive index thereof is changed solely depending on an intensity of the pump light.

8. A light modulating apparatus according to claim 1, wherein the probe light has an x-axis polarized component having a magnitude equal to that of a y-axis polarized component and is incident on said semiconductor device along a z-axis when a <001> direction of a crystal constituting said semiconductor device is defined as the z-axis, a <110> direction is defined as the x-axis, and a <−110> direction is defined as the y-axis.

9. A light modulating apparatus according to claim 2, further comprising a phase plate located in a probe light path extending to said polarizer, said phase plate satisfying the following conditions:

$$\theta = \pi/4$$

$$\phi = -\rho \cdot \epsilon \pm \pi/2$$

where $\theta$ is an angle of a transmission axis of said polarizer relative to the x-axis, $\epsilon$ is a relative phase difference between the x-axis and the y-axis of said semiconductor device when the probe light is not incident thereon, $\rho$ is a relative phase difference between the x-axis polarized component and the y-axis polarized component of the probe light, and $\phi$ is a phase difference of said phase plate.

10. A light modulating apparatus comprising:
 (a) a semiconductyor device comprising,
  a substrate,
  a first semiconductor layer of a first conduction polarity formed on said substrate,
  a multiple quantum well layer formed on said first semiconductor layer,
  a second semiconductor layer of a second conduction polarity formed on said multiple quantum well layer, and
  a pair of electrodes respectively electrically connected to said first and second semiconductor layers;
 (b) a voltage source, connected to said pair of electrodes, for applying a reverse-bias electric field to said semiconductor device;
 (c) means for causing a polarized probe light to impinge on said semiconductor device, the probe light emerging from said semiconductor device such that a polarization state thereof is changed by an electrooptic effect in said multiple quantum well layer;
 (d) means for causing said semiconductor device to receive a pump light which causes a real charge excitation in said multiple quantum well layer, the real charge excitation screening the electric field applied to said quantum well structure; and
 (e) a polarizer for converting a change in polarization state of the light emerging from said semiconductor device into a change in intensity of the light.

11. A light modulating apparatus comprising:
 a semiconductor device including a quantum well structure;

means for applying an electric field to said quantum well structure of said semiconductor device;

means for inputting a probe and pump light into said semiconductor device, the light being output from said semiconductor device with a polarization state of the light being changed by an electrooptic effect in said quantum well structure, and the electric field applied to said quantum well structure being screened by a real charge excitation caused by the light.

12. A light modulating process using a semiconductor device including a quantum well structure, said process comprising the steps of:

applying an electric field to said quantum well structure of said semiconductor device;

inputting a probe light into said semiconductor device, the probe light being output from said semiconductor device with a polarization state of the probe light being changed by an electrooptic effect in said quantum well structure; and inputting a pump light into said semiconductor device for causing a real charge excitation in said quantum well structure, the electric field applied to said quantum well structure being screened by the real charge excitation.

13. A light modulating process according to claim 12, further comprising a step of converting the change of the polarization state of the probe light output from said semiconductor device into an intensity change of the output probe light by a polarizer.

14. A light modulating process according to claim 13, further comprising a step of causing the probe light to pass through a phase plate disposed in a light path of the probe light towards said polarizer.

15. A light modulating process according to claim 12, wherein the probe light has a wavelength of 1.55 $\mu$m and the pump light has a wavelength of about 800 nm corresponding to a band gap energy of said quantum well structure of said semiconductor device.

16. A light modulating process using a semiconductor device including a quantum well structure, said process comprising the steps of:

applying an electric field to said quantum well structure of said semiconductor device;

inputting a probe and pump light into said semiconductor device, the light being output from said semiconductor device with a polarization state of the probe light being changed by an electrooptic effect in said quantum well structure, and the electric field applied to said quantum well structure being screened by a real charge excitation caused by the light.

17. A light modulating process according to claim 16, further comprising a step of converting the change of the polarization state of the light output from said semiconductor device into an intensity change of the output light by a polarizer.

18. A light modulating process according to claim 16, further comprising a step of causing the light to pass through a phase plate disposed in a light path of the light towards said polarizer.

* * * * *

UNITED STATES PATENT AND TRADEMARK OFFICE
CERTIFICATE OF CORRECTION

PATENT NO. : 5,289,489
DATED : February 22, 1994
INVENTOR(S) : JOHAN BERGQUIST, ET AL.

It is certified that error appears in the above-identified patent and that said Letters Patent is hereby corrected as shown below:

COLUMN 3

Line 4, "disadvatage" should read --disadvantage--.

COLUMN 4

Line 52, "laser" should read --and laser--.

COLUMN 5

Line 59, "FIG. 1." should read --FIG. 1--.

COLUMN 6

Line 20, "cunter" should read --counter--.

COLUMN 7

Line 59, "$I=\frac{1}{2} \cdot I_o(1 \pm \sin \Delta\psi\}$" should read --$I=\frac{1}{2} \cdot I_o(1 \pm \sin \Delta\psi)$--.

COLUMN 9

Line 63, "GaAa" should read --GaAs--.

COLUMN 10

Line 37, "semiconductyor" should read --semiconductor--.

UNITED STATES PATENT AND TRADEMARK OFFICE
CERTIFICATE OF CORRECTION

PATENT NO. : 5,289,489
DATED : February 22, 1994
INVENTOR(S) : JOHAN BERGQUIST, ET AL.

Page 2 of 2

It is certified that error appears in the above-identified patent and that said Letters Patent is hereby corrected as shown below:

COLUMN 11

Line 3, "probe" should read --probe light--.

Signed and Sealed this

Thirteenth Day of December, 1994

Attest:

BRUCE LEHMAN

Attesting Officer

Commissioner of Patents and Trademarks